(12) United States Patent
Strasser

(10) Patent No.: US 10,940,769 B2
(45) Date of Patent: Mar. 9, 2021

(54) ASSISTANCE SYSTEM AND METHOD FOR SUPPORTING NON-CONTACT CHARGING OF A BATTERY OF A MOTOR VEHICLE, AND MOTOR VEHICLE

(71) Applicant: AUDI AG, Ingolstadt (DE)

(72) Inventor: Roman Strasser, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 132 days.

(21) Appl. No.: 16/389,151

(22) Filed: Apr. 19, 2019

(65) Prior Publication Data
US 2019/0329667 A1    Oct. 31, 2019

(30) Foreign Application Priority Data

Apr. 27, 2018 (DE) ...................... 10 2018 206 591.8

(51) Int. Cl.
*G06T 7/00* (2017.01)
*B60L 53/66* (2019.01)
*G06T 7/73* (2017.01)
*B60L 53/12* (2019.01)

(52) U.S. Cl.
CPC ............... *B60L 53/66* (2019.02); *B60L 53/12* (2019.02); *G06T 7/001* (2013.01); *G06T 7/0002* (2013.01); *G06T 7/74* (2017.01); *G06T 2207/20081* (2013.01)

(58) Field of Classification Search
CPC ...... B60L 53/12; B60L 53/124; G06T 7/0002; G06T 7/001; G06T 2207/20081
See application file for complete search history.

(56) References Cited

U.S. PATENT DOCUMENTS

| 2015/0168309 | A1* | 6/2015 | Goethel | B60L 53/126 320/108 |
| 2018/0152057 | A1* | 5/2018 | Misawa | H04N 7/183 |
| 2018/0342907 | A1* | 11/2018 | Dimke | B60L 53/122 |
| 2019/0050123 | A1* | 2/2019 | Asano | G06F 3/0484 |

(Continued)

FOREIGN PATENT DOCUMENTS

| DE | 10 2009 033 236 A1 | 1/2011 |
| DE | 10 2011 109 834 A1 | 2/2013 |
| DE | 10 2012 215 376 A1 | 5/2014 |

(Continued)

OTHER PUBLICATIONS

Examination Report dated Dec. 20, 2018 of corresponding German application No. 10 2018 206 591.8; 18 pages.

*Primary Examiner* — Sean T Motsinger
(74) *Attorney, Agent, or Firm* — Maier & Maier, PLLC

(57) ABSTRACT

An assistance system to support non-contact charging of a battery of a motor vehicle, a corresponding method, and a corresponding motor vehicle having such an assistance system. In order to support non-contact charging, it is provided that, by a camera, a respective current image of a base plate of an off-board means providing electrical energy for the charging is captured. The captured image is compared to a predetermined reference image showing the base plate in a condition suitable for charging by a data processor. If a difference is detected, a request is automatically issued to a driver of the motor vehicle, prompting the driver to examine the base plate and confirm that the base plate is free of foreign objects interfering with charging.

7 Claims, 2 Drawing Sheets

(56) References Cited

U.S. PATENT DOCUMENTS

2020/0047623 A1* 2/2020 Zadrozny ................ B60L 53/38
2020/0144868 A1* 5/2020 Niwa ...................... H02J 7/025

FOREIGN PATENT DOCUMENTS

| DE | 10 2013 217 713 A1 | 3/2015 |
| DE | 10 2014 015 577 A1 | 4/2015 |
| DE | 10 2014 222 486 A1 | 5/2016 |

* cited by examiner

ASSISTANCE SYSTEM AND METHOD FOR SUPPORTING NON-CONTACT CHARGING OF A BATTERY OF A MOTOR VEHICLE, AND MOTOR VEHICLE

FIELD

The disclosure relates to an assistance system for supporting non-contact charging of a battery of a motor vehicle, a corresponding method of supporting non-contact charging, and a motor vehicle having a corresponding assistance system.

BACKGROUND

Ways and charging means for the non-contact, in particular inductive, charging of batteries—including, but not limited to, traction batteries of electric vehicles—are generally known. Here, an off-board charging means and an on-board charging means cooperate to achieve an exchange or transfer of energy. However, with such non-contact charging means or systems, a safe, reliable and efficient energy transfer is only possible if the corresponding charging means, in particular the off-board charging means, is clean and free of foreign objects. The off-board charging means may then in particular comprise an inductor embedded in the ground or arranged on a ground. If a foreign object is present on or above this inductor, then this can impact electrical properties of the inductor or the charging means, or the energy transfer. Similarly, the foreign objects themselves, for example, may be influenced or damaged, for example, by heating due to an applied electromagnetic field. Therefore, there are complex systems or means which require sophisticated measuring technology and attempt to detect foreign objects present on the inductor by checking or measuring respective electrical parameters. This is associated with high complexity and the related high costs.

DE 10 2013 217 713 A1 teaches a transmitter coil for inductive energy transfer from the transmitter coil to a receiver coil, and a method of detecting a foreign object between the transmitter coil and the receiver coil. A pattern plate is provided which is arranged in a plane above the transmitter coil and to which an optical contrast pattern is applied. The optical contrast pattern is detected by an optical detection means to determine whether a foreign object is present between the transmitter coil and the receiver coil.

DE 10 2014 222 486 A1 describes a method for monitoring an inductive transmission link for living objects. When the inductive transmission link is switched on, a safety zone is monitored for penetrating objects, and the inductive transmission link is switched off if such an object is detected. When the inductive transmission link is switched off, the safety zone is monitored for the presence of a living object, and the inductive transmission link is enabled when such an object is detected.

DE 10 2014 015 577 A1 discloses a vehicle-side apparatus for detecting and removing a foreign object from an area between a vehicle-side secondary coil and an infrastructure-side primary coil for inductive charging of a traction battery of a vehicle. The apparatus has a means for removing a foreign object detected in the area between the secondary coil and the primary coil. For this purpose, a sound, a light signal or an airflow may be generated.

SUMMARY

It is an object of the invention to reliably enable safe non-contact charging of battery of a motor vehicle with particularly low effort.

According to the invention, this object is achieved by the subject-matters of the independent claims. Advantageous designs of the invention are set forth in the dependent claims and in the following description and in the drawings.

An assistance system according to the invention is used—i.e., is adapted—to support non-contact charging of a battery of a motor vehicle. The assistance system according to the invention has a camera and is configured to capture, by means of the camera, a respective current image of a base plate of an off-board means providing electrical energy for charging. The base plate is in particular arranged on a ground or embedded into a ground, wherein the ground is a surface driven on by the motor vehicle. Preferably, the base plate may contain or comprise a transmitter coil by means of which electrical energy for charging the battery of the motor vehicle may be transmitted or transferred to the motor vehicle, in particular an on-board receiver coil. Thus, the off-board means comprised in the base plate forms at least a part of an off-board charging infrastructure or charging station. The battery may in particular be a traction battery, wherein the motor vehicle may then in particular be an electric vehicle.

According to the invention, the assistance system is configured to compare the respective currently captured image of the base plate to a predetermined reference image by means of a data processing means. The predetermined reference image shows the base plate in a condition suitable for charging, i.e., in particular without any foreign objects present on the base plate. For the purposes of the present invention, the respective currently captured image means an image captured prior to, in particular immediately prior to, positioning the motor vehicle above the base plate to charge the battery. In this respect, it is particularly preferred for a maximum time interval to be specified between a capturing time at which the respective currently captured image was captured and an intended start of charging. Accordingly, as an example, a maximum age of the respective currently captured image may also be specified. If the maximum time interval and/or the maximum age is exceeded, then it may be provided that a new, then current image of the base plate is captured or is to be captured first. According to the invention, the assistance system is configured to determine or detect a difference between the respective currently captured image and the reference image by comparing the respective currently captured image and the reference image. Furthermore, the assistance system according to the invention is configured, if such a difference is detected, to issue a request to a driver of the motor vehicle. This request prompts the driver to examine the base plate and confirm that the base plate is free of foreign objects interfering with charging. Similarly, a corresponding waring may be issued to the driver warning them that safe charging might not be possible.

Thus, in other words, an acknowledgment by the driver is provided for in order to determine, in a particularly reliable and safe manner, that the base plate is free of foreign objects and therefore in a condition suitable and safe for charging, then allowing the battery of the motor vehicle to be charged. Thus, upon the request, the driver may optionally remove the foreign object present on the base plate manually and then confirm that the base plate is now free of foreign objects.

This procedure is particularly safe, reliable and advantageous since, despite all technical progress in the area of automatic image processing and object detection, foreign objects actually or potentially interfering with charging can still be detected by the human eye with greater reliability than by machine processes. Moreover, the thus prompted driver may also be motivated to remove the possible foreign object present on the base plate as necessary. Therefore, by obtaining confirmation by the driver, it is particularly safe and reliable to assume that the base plate is really free of interfering foreign objects. Hence, for example, charging may also be performed if an automatic algorithm for detecting foreign objects is no longer able to independently automatically determine or detect with sufficient confidence whether the base plate is free of foreign objects, e.g., due to certain lighting conditions, due to shadows cast, due to a variable or non-optimal perspective of the camera, contamination of the camera or the like. Thus, in other words, the confirmation given by the respective driver on the base plate being free of foreign objects may overrule or overwrite an automatic estimation on this condition by the data processing means, i.e., have a higher priority.

In an advantageous design of the present invention, the data processing means is configured to process the respective currently captured image by means of an object detection algorithm and only issue the request to the driver if a foreign object shown on the respective currently captured image which is not shown on the reference image has been detected as the difference. Thus, in other words, not all differences are interpreted such that the base plate is not in the condition suitable for charging. Advantageously, by using the object detection algorithm, different lighting or illumination or different perspectives between the respective currently captured image and the reference image, for example, may be ignored or not considered in an assessment or decision on whether the base plate is in the condition suitable for charging. The object detection algorithm may in particular comprise edge or contour detection. Advantageously, this helps to reduce a false detection rate such that the request is issued to the driver less frequently while the base plate is actually free of foreign objects, i.e., in the condition suitable for charging.

In an advantageous design of the present invention, the assistance system is configured to detect that the motor vehicle approaches the base plate up to a predetermined distance. The assistance system is then further configured, upon having detected such approaching, to capture the then respectively current image of the base plate automatically before the motor vehicle reaches the base plate. Thus, in other words, it is intended to automatically cause and perform the capturing or imaging of the base plate to generate the then respectively current image, while the base plate is located in front of the motor vehicle in the driving direction, i.e., the motor vehicle is not yet on or above the base plate. Accordingly, the assistance system is then configured to compare the captured current image to the reference image and also issue the request to the driver, if applicable, before the motor vehicle reaches the base plate. Thus, this means that the request is issued to the driver when a difference is detected or when a foreign object is detected on the base plate, before the base plate is occluded by the motor vehicle. Therefore, this allows to keep the base plate free for the driver to examine the base plate. Advantageously, this enables a particularly convenient and reliable examination of the base plate by the driver. Also, it is easier for the driver to remove any foreign object which might be present on the base plate.

In an advantageous design of the present invention, the assistance system has an interface for connection to a charge controller of the motor vehicle. Furthermore, the assistance system is then configured to, upon receiving the confirmation of the request, generate a control signal to authorize charging and issue it to the charge controller via the interface. Thus, in other words, it is intended that non-contact charging is only authorized or enabled if the driver actively confirmed that the base plate is free of foreign objects. This applies at least if the data processing means detected the or a difference between the respective currently captured image and the reference image. Advantageously, this may help to avoid, for example, that the charging is automatically started by the off-board means as soon as the motor vehicle is within range, i.e., is present in a position intended for charging. Similarly, advantageously, the data processing means may generate a blocking signal when detecting the or a difference, and transmit it to the charge controller and/or to the off-board means. Overall, the safety during operation of the means for non-contact charging can thus be improved further.

In an advantageous design of the present invention, the data processing means has a learning algorithm for detecting the difference. The assistance system is then configured to issue a query to the driver to inquire whether there actually was a foreign object on the base plate. Furthermore, the assistance system is then configured to train the learning algorithm based on the respective response received to the query. Thus, in other words, a method of machine learning, e.g., a neural network, is employed to improve the automatic detection as to whether the base plate is in the condition suitable for charging.

As an example, the case may arise that the data processing means detects a difference between the respective currently captured image and the reference image and correspondingly issues the request to the driver, but the driver determines by examination or inspection of the base plate that there is actually no interfering foreign object present on the base plate. Then, the driver may not only confirm that the base plate is free of foreign objects, but also explicitly indicate that there was no foreign object present on the base plate, or at least no foreign object interfering with charging. On this premise or basis, the learning algorithm then learns for the processing of the respective currently captured image that a respective image property resulting in the difference being detected should not be detected or interpreted as a difference or impediment for charging. Thus, the algorithm then learns that a corresponding image pattern does not correlate with the presence of an interfering foreign object. Advantageously, such a learning algorithm allows to improve the assistance system over time to, in particular, support non-contact charging in a safer and more reliable manner and, in particular, be employed flexibly in different situations and environments. This is particularly advantageous since corresponding means for non-contact charging of vehicles or vehicle batteries can be operated in an unmanageably large number and variety of different situations, circumstances and conditions.

In an advantageous design of the present invention, the assistance system is configured to issue the respective currently captured image to the driver as a part of the request or in addition to the request. Thus, in other words, together with the request to ensure and confirm that the base plate is free of foreign objects, the driver is presented with a data basis resulting in the request in the form of the respective currently captured image. Particularly advantageously, this may increase an ease of use or operation for the driver as they may not have to leave the motor vehicle in order to examine the base plate.

For example, in order to be issued to the driver, the respective currently captured image may be presented on a display means or a screen of the motor vehicle. In this respect, particularly advantageously, a section of the respective currently captured image in which the difference was detected may be highlighted or marked—e.g., by color or visually—to facilitate assessment or evaluation by the driver. In addition, the predetermined reference image may advantageously also be issued to the driver as a part of the request or along with the request, for example, displayed next to the respective currently captured image. This may make it even easier for the driver to assess or estimate the respective situation.

It is particularly preferred that an input made by the driver, which further specifies or marks the difference and/or indicates additional differences, is received by the data processing means and is preferably taken into account when processing images captured in the future, for example. As an example, such inputs or markings by the driver may advantageously be used for training the learning algorithm. For example, such inputs or markings may be done by the driver by touching the display means correspondingly if the latter is formed as a touch-sensitive or touch-responsive screen (touchscreen). Similarly, such inputs or markings may be entered or made by the driver via an operating panel connected to the data processing means, in particular a touchpad, for example. The display means and/or the operating panel or a corresponding operating element may be a part of the assistance system or connected to the assistance system as a part of the motor vehicle.

In an advantageous design of the present invention, the camera is configured to transmit the respective currently captured image to the data processing means. The data processing means may comprise an, in particular off-board, server means or be formed as such and is then configured to receive and process a plurality of images of other base plates captured by a plurality of different cameras, in particular cameras of a plurality of different motor vehicles, and take them into account to improve an accuracy in the detection of the difference. Thus, in other words, the data processing means may be formed as a cloud or back-end server, for example, which can then provide an improved detection of the difference based on the plurality of images transmitted which are thus captured and transmitted by a cluster or fleet of a plurality of cameras or motor vehicles. Advantageously, this helps to achieve detection performance, in particular accuracy or reliability when detecting the difference or detecting whether the respective base plate is in the or a condition suitable for charging. It is particularly preferred that a learning algorithm, e.g., a neural network, employed for this purpose can then be trained in a particular effective manner.

Similarly, however, it may also be possible that the data processing means may have this functionality and is then still formed as an on-board part of the assistance system as intended. For this purpose, other cameras or vehicles may then transmit their respectively captured images to the motor vehicle, e.g., by means of vehicle-2-vehicle communication or by transmission via a server. Thus, in other words, the cameras or motor vehicles of the cluster or fleet can exchange captured images with each other to each achieve improved accuracy and reliability when processing respective images, i.e., when detecting differences from a respective reference image.

A further aspect of the present invention is a motor vehicle having an assistance system according to the invention. Thus, the motor vehicle according to the invention can then in particular have a rechargeable battery, in particular a traction battery, a charging means for non-contact charging of the battery, and the data processing means or a communication means for exchanging data with the off-board data processing means. In particular, the motor vehicle according to the invention may have a charge controller coupled to the assistance system or to the data processing means, which controls, regulates or influences the operation of the on-board charging means, i.e., an energy transfer between the off-board means or the base plate and the battery of the motor vehicle. Similarly, the motor vehicle according to the invention may have a correspondingly connected communication means for sending and/or receiving images or image data, i.e., for exchanging data with one or more other motor vehicles, with one or more off-board cameras and/or at least one off-board server means. The motor vehicle according to the invention may comprise or include the assistance system according to the invention in particular in an embodiment which does not comprise any off-board means, in particular any of said server means.

In an advantageous design of the present invention, the camera is provided as a part of the motor vehicle and arranged to be oriented such that it captures a ground area located in front of the motor vehicle in the driving direction of the motor vehicle. Hence, said base plate can thus be captured and visualized by means of the camera before the motor vehicle drives over the base plate, i.e., is on or above the base plate. In particular, this may be the case irrespective of whether the motor vehicle is moving forward or backward. For this purpose, multiple cameras oriented in different directions may be provided. For example, at least one camera oriented forwards in the longitudinal direction of the vehicle and one camera oriented backwards in the longitudinal direction of the vehicle may be provided, i.e., arranged at the motor vehicle.

A further aspect of the present invention is a method of supporting non-contact charging of a battery of a motor vehicle. In the method, a respective current image of a base plate of an off-board means providing electrical energy for charging the battery is captured by means of a camera. In an further method step, the respective currently captured image is compared to a predetermined reference image showing the base plate in a condition suitable for charging by means of a data processing means. In a further method step, if a difference is or was detected between the respective currently captured image and the reference image during the comparison, a request is issued to a driver of the motor vehicle. This request prompts the driver to examine the base plate and confirm that the base plate is free of foreign objects interfering with charging.

Thus, the assistance system according to the invention and/or the motor vehicle according to the invention may in particular be configured to perform or carry out at least one embodiment of the method according to the invention, and the components and means mentioned in connection with the method according to the invention, such as the motor vehicle, the camera, the base plate, the data processing means and the like, may in particular be the respective components and means mentioned in connection with the assistance system according to the invention and/or the motor vehicle according to the invention.

The assistance system according to the invention and/or the motor vehicle according to the invention may each include a data storage having a program code coding or representing the method steps of the method according to the invention. Similarly, the assistance system according to the invention and/or the motor vehicle according to the invention may include a processor means connected to the respective data storage for executing this program code.

The present invention likewise applies to bidirectional charging means or charging systems, i.e., in which an energy transfer is possible between the respective off-board means and the motor vehicle in both directions.

The invention also comprises the combinations of the features and/or embodiments described for all aspects of the invention.

The invention also includes further developments of the method according to the invention, the motor vehicle according to the invention and the assistance system according to the invention having the features for avoiding unnecessary redundancy only described explicitly in connection with one aspect of the invention. For this reason, the corresponding further developments of the method according to the invention, the motor vehicle according to the invention and the assistance system according to the invention are not redundantly described again herein in all of their combinations.

BRIEF DESCRIPTION OF THE DRAWINGS

Exemplary embodiments of the invention are described in the following. In the drawings.

DETAILED DESCRIPTION

The exemplary embodiments explained hereinafter are preferred embodiments of the invention. In the exemplary embodiments, the described components of the embodiments constitute individual features of the invention which are to be considered independently of each other, each also developing the invention further independently of each other and, therefore, are to be considered as a part of the invention individually or in a combination other than the one shown. Furthermore, the embodiments described may also be supplemented by further features of the invention already described.

Figure 1:
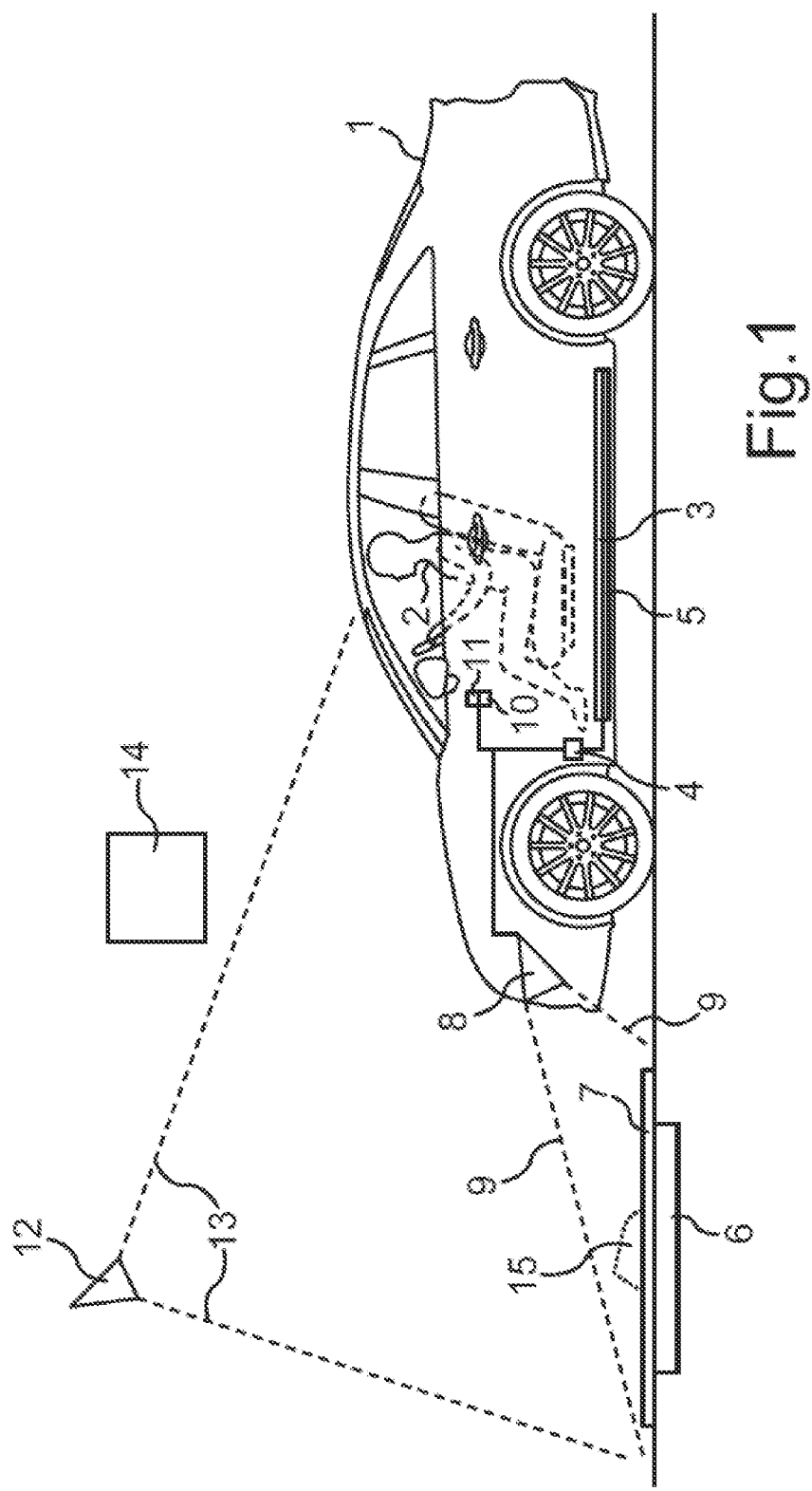
FIG. 1 shows a schematic side view of a motor vehicle having a charging system for non-contact charging of a traction battery of the motor vehicle.

FIG. 1 shows a schematic side view of a motor vehicle 1, here conducted by a driver 2. Motor vehicle 1 is, in particular, an electric vehicle and as such has a traction battery 3 herein. Coupled thereto is a charge controller 4 of the motor vehicle 1. Furthermore, motor vehicle 1 includes a receiver coil coupled to traction battery 3 and charge controller 4 to receive electromagnetic energy for charging traction battery 3 in a non-contact charging process.

Thus, traction battery 3 can be charged in a non-contact manner via receiver coil 5 by means of a correspondingly adapted off-board charging means 6. Herein, off-board charging means 6 is shown partially embedded in a ground or surface driven on by motor vehicle 1 in forward direction of motor vehicle 1. Off-board charging means 6 comprises a base plate 7 in which a transmitter coil, not shown in detail here, is arranged to transfer electrical or electromagnetic energy to receiver coil 5. For non-contact charging of traction battery 3 by means of off-board charging means 6 and receiver coil 5, motor vehicle 1, in particular receiver coil 5, must be vertically above base plate 7 with respect to the ground.

Motor vehicle 1 further includes a camera 8 arranged or oriented such that a field of view 9 of camera 8, here indicated schematically, captures base plate 7 while base plate 7 is still in front of motor vehicle 1. In this respect, the arrangement of camera 8 shown here is to be taken as an example. Preferably, camera 8 may similarly be arranged on or behind a windshield of motor vehicle 1. In addition, motor vehicle 1 may include a corresponding rear or reversing camera not shown here, which is oriented such that, for example, base plate 7 is captured when motor vehicle 1 approaches it in reverse. Furthermore, motor vehicle 1 includes a data processing means 10 and on operating and display means 11. Data processing means 10 is connected to both charge controller 4 and camera 8 and to operating and display means 11, e.g., via an on-board network of motor vehicle 1.

Furthermore, FIG. 1 schematically shows an off-board camera 12 having a schematically indicated field of view 13 and an off-board server means 14. Here, off-board camera 12 is arranged and oriented such that its field of view 13 captures both base plate 7 and an access area in front of base plate 7, wherein this access area must be traversed by motor vehicle 1 to reach base plate 7 for charging.

For safe and reliable and efficient charging of traction battery 3 by means of off-board charging means 6 and receiver coil 5, base plate 7 must be in a condition suitable for charging, in particular free of foreign objects. Here, such a foreign object 15 which may interfere with charging is shown schematically as lying on base plate 7. Foreign object 15 is shown as a dashed line here as it may be present on base plate 7 at one moment, but then be removed by driver 2 from base plate 7.

Figure 2:
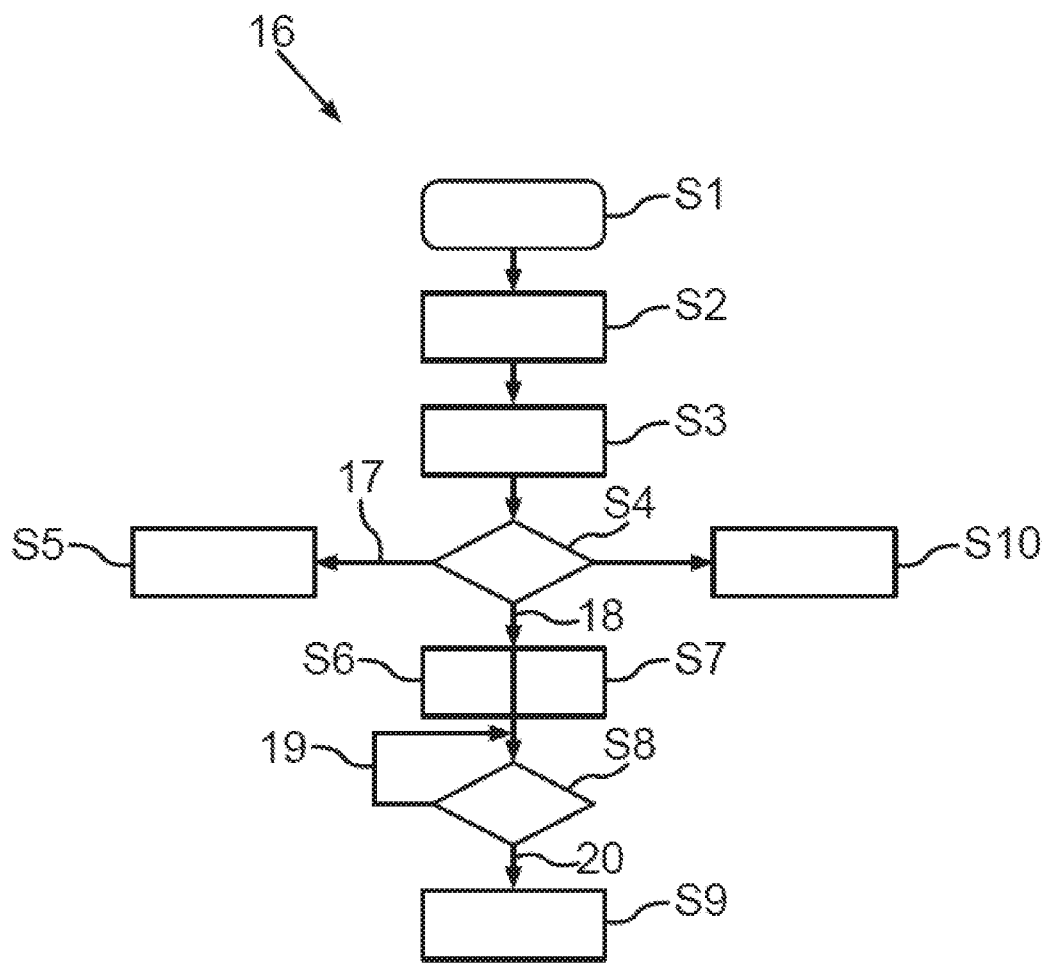
FIG. 2 shows an exemplary schematic flow chart of a method of supporting non-contact charging of a battery of a motor vehicle.

FIG. 2 shows an exemplary schematic flow chart 16 of a method of supporting non-contact charging of traction battery 3 of motor vehicle 1. This method is now explained with reference to FIG. 1.

The method starts with a method step S1. Here, motor vehicle 1 is detected approaching the base plate. This may be accomplished by means of data processing means 10, e.g. by continuously or regularly processing the images captured and provided by camera 8. Similarly, off-board camera 12 may capture or detect motor vehicle 1 as soon as it enters the access area, i.e., field of view 13. A corresponding image or a corresponding signal may then to transmitted by off-board camera 12 to motor vehicle 1, in particular to data processing means 10. Additionally or alternatively, other or further means, in particular sensors or sensor means, may be provided and used to detect motor vehicle 1 approaching base plate 7.

As motor vehicle 1 approaches base plate 7, it enters field of view 9 of camera 8. In a method step S2, a current image of base plate 7 is captured by means of camera 8 and transmitted to data processing means 10 in a method step S3. Additionally or alternatively, in method step S3, the currently captured image is transmitted from camera 8 or from data processing means 10 to external server means 14. Similarly, the currently captured image may be captured by off-board camera 12 and transmitted to data processing means 10 and/or to server means 14. This may be advantageous to, for example, ensure an improved, in particular constant, perspective on base plate 7.

In a method step S4, the currently captured image is processed by data processing means 10 and/or by server means 14, thereby comparing it to a predetermined reference image of base plate 7. The reference image shows base plate 7 free of foreign objects 15 interfering with non-contact charging of traction battery 3, i.e., in a condition suitable for non-contact charging. If said processing of the currently captured image and the corresponding comparison to the reference image is performed by server means 14, then it transmits a respective comparison result of the comparison to motor vehicle 1, in particular to data processing means 10. Otherwise, data processing means 10 itself identifies the respective comparison result.

If no difference between the two images is detected when comparing the respective currently captured image to the predetermined reference image, the method follows a path 17 to a method step S5.

In method step S5, data processing means 10 generates an authorization signal and transmits it to charge controller 4 and/or to off-board charging means 6. This authorization signal authorizes or activates charging of the traction battery. Subsequently, the method or a current cycle of the method ends.

However, if a difference between the currently captured image and the reference image is detected in method step S4, the method follows a path 18. Following path 18, in a method step S6, a blocking signal is transmitted from data processing device 10 to charge controller 4 and/or to off-board charging means 6. This blocking signal blocks non-contact charging of traction battery 3. If motor vehicle 1 is an autonomous or semi-autonomous vehicle approaching base plate 7 during an autonomous driving operation, then the blocking signal may also cause motor vehicle 1 to automatically stop in front of base plate 7.

Concurrently, in a method step S7, a request is issued to driver 2 by data processing means 10, prompting driver 2 to examine base plate 7 and ensure and confirm that base plate 7 is free of foreign objects 15 interfering with charging. Herein, this request is displayed together with the currently captured image and the reference image by means of operating and display means 11 to be issued to driver 2.

In a method step S8, data processing means 10 continuously checks whether driver 2 confirmed the request, i.e., whether a corresponding confirmation was received by data processing means 10. If not, then the method follows a loop path 19 indicating the continuous checking for receipt of the confirmation.

In response to the request, it is then intended that driver 2 examines base plate 7—either by looking at the currently captured image displayed by operating and display means 11 and/or by looking at base plate 7 in front of motor vehicle 1. In the present case, it is intended in this respect that driver 2 removes foreign object 15 from base plate 7. Subsequently, it is intended that driver 2 confirms the request as base plate 7 will then actually be free of foreign object 15.

After data processing means 10 has received the confirmation of the request, the method follows a path 20 to a method step S9. In method step S9, based on the confirmation then received, it is assumed that base plate 7 is now actually free of foreign objects 15, and therefore, the authorization signal is transmitted to charge controller 4 and/or to off-board charging means 6 to authorize non-contact charging of traction battery 3. If motor vehicle 1 approached base plate 7 in an autonomous driving operation, the authorization signal also causes motor vehicle 1 to drive over base plate 7, i.e., automatically maneuver over base plate 7 such that receiver coil 5 arrives above or overlying base plate 7 and the transmitter coil arranged therein for non-contact charging of traction battery 3. Subsequently, the non-contact charging of traction battery 3 may be caused or started.

Independently of the comparison result identified in method step S4, after identifying or determining it, a query can be issued to driver 2 in a method step S10. This query explicitly inquires whether base plate 7 is or is not free of foreign objects 15. A response to this request entered by driver 2, e.g., by means of operating and display means 11, is then used to train an image processing or image comparison algorithm by which the respective comparison result was identified. For this purpose, the response given by driver 2 to the query in method step S10 is received and processed by data processing means 10 and/or transmitted to server means 14 and/or to other motor vehicles, in particular along with the respective currently captured image as an associated data basis.

Overall, the examples described show how safe non-contact charging of a rechargeable battery of a vehicle can be made possible in a particular reliable manner with particularly low technical effort.

The invention claimed is:

1. An assistance system for supporting non-contact charging of a battery of a motor vehicle, comprising:
the assistance system has a camera and is configured to capture, by the camera, a respective current image of a base plate of an off-board means providing electrical energy for charging, wherein the assistance system is configured to compare, by a data processor, the respective currently captured image of the base plate to a predetermined reference image showing the base plate in a condition suitable for charging, and if a difference is detected between the respective currently captured image and the reference image, a request is issued to a driver of the motor vehicle, prompting the driver to examine the base plate and confirm that the base plate is free of foreign objects interfering with charging, wherein the camera is configured to transmit the respective currently captured image to the data processor, wherein the data processor includes an, in particular off-board, server and is configured to receive and process a plurality of images of other base plates captured by a plurality of different cameras and take them into account to improve an accuracy in the detection of the difference.

2. The assistance system as claimed in claim 1, wherein the data processor is configured to process the respective currently captured image by an object detection algorithm and only issue the request to the driver if a foreign object shown on the respective currently captured image which is not shown on the reference image has been detected as the difference.

3. The assistance system as claimed in claim 1, wherein the assistance system is configured to detect that the motor vehicle approaches the base plate up to a predetermined distance and, upon having detected such approaching, to capture the then respectively current image of the base plate automatically and issue the request to the driver, if applicable, before the motor vehicle reaches the base plate.

4. The assistance system as claimed in claim 1, wherein the assistance system has an interface for connection to a charge controller of the motor vehicle and configured to, upon receiving the confirmation of the request, generate a control signal to authorize charging and issue it to the charge controller via the interface.

5. The assistance system as claimed in claim 1, wherein the data processor has a learning algorithm for detecting the difference, and the assistance system is configured to:
issue a query to the driver to inquire whether there actually was a foreign object on the base plate, and
train the learning algorithm based on a response received to the query.

6. The assistance system as claimed in claim 1, wherein the assistance system is configured to issue the respective currently captured image as a part of the request to the driver.

7. A method of supporting non-contact charging of a battery of a motor vehicle, comprising:
by a camera, a respective current image of a base plate of an off-board means providing electrical energy for the charging is captured, wherein
the respective currently captured image is compared to a predetermined reference image showing the base plate in a condition suitable for charging by a data processor,
if a difference is detected between the respective currently captured image and the reference image during the comparison, a request is issued to a driver of the motor vehicle, prompting the driver to examine the base plate and confirm that the base plate is free of foreign objects interfering with charging, wherein the camera is configured to transmit the respective currently captured image to the data processor, wherein the data processor includes an, in particular off-board, server and is configured to receive and process a plurality of images of other base plates captured by a plurality of different cameras and take them into account to improve an accuracy in the detection of the difference.

* * * * *